US012596392B2

(12) United States Patent
Fuller et al.

(10) Patent No.: US 12,596,392 B2
(45) Date of Patent: Apr. 7, 2026

(54) PEDAL ASSEMBLIES INCLUDING REDUNDANT SENSING SYSTEMS

(71) Applicant: KSR IP Holdings, LLC, Wilmington, DE (US)

(72) Inventors: Shaun Fuller, Thamesville (CA); Jaesung Kim, Ridgetown (CA); Marty Vanek, Thamesville (CA); Michael Olajos, South Woodslee (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 18/978,743

(22) Filed: Dec. 12, 2024

(65) Prior Publication Data

US 2025/0199561 A1 Jun. 19, 2025

Related U.S. Application Data

(60) Provisional application No. 63/610,700, filed on Dec. 15, 2023.

(51) Int. Cl.
| | |
|---|---|
| *G05G 1/38* | (2008.04) |
| *G01D 5/14* | (2006.01) |
| *G01D 5/20* | (2006.01) |
| *G05G 1/44* | (2008.04) |
| *G05G 5/03* | (2008.04) |

(52) U.S. Cl.
CPC .............. *G05G 1/38* (2013.01); *G01D 5/145* (2013.01); *G01D 5/2046* (2013.01); *G05G 1/44* (2013.01); *G05G 5/03* (2013.01); *G01D 2205/24* (2021.05); *G05G 2505/00* (2013.01)

(58) Field of Classification Search
CPC .................................................. G01D 2205/24
See application file for complete search history.

(56) References Cited

U.S. PATENT DOCUMENTS

| | | | | |
|---|---|---|---|---|
| 6,736,233 | B2 * | 5/2004 | Beishline ............... | H02K 11/38 |
| | | | | 74/513 |
| 9,446,745 | B2 | 9/2016 | Elliott et al. | |
| 11,079,789 | B2 * | 8/2021 | Ford ..................... | B60K 26/02 |
| 11,932,220 | B2 | 3/2024 | Kauz | |

(Continued)

FOREIGN PATENT DOCUMENTS

| | | |
|---|---|---|
| CN | 105292084 A | 2/2016 |
| CN | 112576380 A | 3/2021 |
| GB | 2404967 A | 2/2005 |

*Primary Examiner* — Vicky A Johnson
(74) *Attorney, Agent, or Firm* — Dinsmore & Shohl LLP

(57) ABSTRACT

Embodiments herein are directed to a pedal assembly that includes a pedal arm, a drive assembly, and a sensing assembly. The pedal arm having a pair of protrusions extending therefrom and at least one has a geared surface. The drive assembly has a gear configured to complement the geared surface of the one of the protrusions. The sensing assembly has a first sensor assembly configured to sense movement of the gear and a second sensor assembly configured to sense movement of the at least one of the pair of protrusions. When a force is applied onto the pedal arm, the at least one of the pair of protrusions having the geared surface moves to drive the gear, the first sensor assembly and the second sensor assembly independently sense the movement of the gear and the at least one of the pair of protrusions, respectively.

20 Claims, 13 Drawing Sheets

(56) References Cited

U.S. PATENT DOCUMENTS

| | | | |
|---|---|---|---|
| 2008/0276749 | A1 | 11/2008 | Stewart et al. |
| 2011/0277583 | A1 | 11/2011 | Elliott |
| 2012/0056739 | A1 | 3/2012 | Lee et al. |
| 2021/0039612 | A1* | 2/2021 | Marquez Sanchez .. B60T 8/326 |
| 2023/0114657 | A1 | 4/2023 | Wagner et al. |
| 2023/0415712 | A1 | 12/2023 | Neill |
| 2024/0271965 | A1 | 8/2024 | Kim et al. |

* cited by examiner

PEDAL ASSEMBLIES INCLUDING REDUNDANT SENSING SYSTEMS

CROSS-REFERENCE TO RELATED APPLICATIONS

This utility patent application claims priority benefit from U.S. provisional patent application Ser. No. 63/610,700 filed Dec. 15, 2023, entitled "Parallel Axis Dichotomic Sensing", the entire contents of which is incorporated herein in its entirety.

TECHNICAL FIELD

The present specification generally relates to pedal assemblies, and, more specifically to redundant sensing arrangements in pedal assemblies.

BACKGROUND

It is generally known in pedal assemblies to use a pivot pin to couple a pedal arm to a housing to permit the pedal arm to pivot about the pivot pin relative to the housing when a load is applied or removed from a pedal pad. However, pivot pins are additional parts and costs, the pivot pin needs to be keyed to a pedal arm, the housing is more complex, and sensor assemblies are more complex and not protected from outside elements and changes in air gaps. Further, it is known that in Hall Effect sensing techniques in pedal assemblies, slight movements are not sensed properly.

Accordingly, a need exists for alternative apparatus for sensing slight movements while eliminating inaccuracies, permitting for redundant sensing, and providing an integrated pivot pin.

SUMMARY

In one embodiment, a pedal assembly is provided. The pedal assembly includes a housing, a pedal arm, a drive assembly, and a sensing assembly. The pedal arm is moveably coupled to the housing. The pedal arm having a pair of protrusions extending therefrom. At least one of the pair of protrusions having a geared surface. The drive assembly has a gear configured to have a plurality of teeth that complement the geared surface of the one of the pair of protrusions. The sensing assembly has a first sensor assembly configured to sense movement of the gear and a second sensor assembly configured to sense movement of the at least one of the pair of protrusions. When a force is applied on a pedal pad of the pedal arm, the at least one of the pair of protrusions having the geared surface moves to drive the gear, the first sensor assembly and the second sensor assembly independently sense the movement of the gear and the at least one of the pair of protrusions, respectively.

In another embodiment, a pedal assembly configured for redundant sensing is provided. The pedal assembly includes a housing, a first member, a second member, a pedal arm, and a drive assembly. The housing includes a retaining recess. The first member has a first receiving cavity. The second member has a second receiving cavity. The pedal arm is moveably coupled to the housing. The pedal arm has a pair of protrusions extending therefrom. At least one of the pair of protrusions has a geared surface. One of the pair of protrusions is movably received within the first receiving cavity of the first member and the other one of the pair of protrusions is movably received within the second receiving cavity of the second member. The drive assembly includes a gear configured to have a plurality of teeth that complement the geared surface of the one of the pair of protrusions. When a force is applied onto a pedal pad of the pedal arm, the at least one of the pair of protrusions having the geared surface moves to drive the gear, a first sensor assembly and a second sensor assembly independently sense the movement of the gear and the at least one of the pair of protrusions, respectively.

In yet another embodiment, a pedal assembly is provided. The pedal assembly includes a housing, a retaining assembly, a pedal arm, a drive assembly, and a sensing assembly. The retaining assembly has a pair of openings and is removably coupled to the housing. The pedal arm is moveably coupled to the retaining assembly. The pedal arm has a pair of protrusions extending therefrom such that each one of the pair of protrusions are received into the respective opening of the retaining assembly. At least one of the pair of protrusions having a geared surface. The drive assembly includes a gear configured to have a plurality of teeth that complement the geared surface of the one of the pair of protrusions. The sensing assembly includes a first sensor assembly configured to sense movement of the gear and a second sensor assembly configured to sense movement of the at least one of the pair of protrusions. When a force is applied on a pedal pad of the pedal arm, the at least one of the pair of protrusions having the geared surface moves to drive the gear, the first sensor assembly and the second sensor assembly independently sense the movement of the gear and the at least one of the pair of protrusions, respectively.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to pedal assemblies that utilize an integrated pivot portion extending from a proximate end of a pedal arm while simultaneously sensing the movement of the proximate end of the pedal arm using an inductive sensing techniques and utilizing a drive assembly to sense the movement of the proximate end of the pedal arm via Hall Effect sensing techniques. As such, the proximate end of the pedal arm includes a coupler that moves upon a change in force applied to the pedal arm, such as by a user to a pedal pad positioned at distal end of the pedal arm. The proximate end of the pedal arm includes a pair of protrusions in which at least one of these has a geared surface. The drive assembly includes a gear with a plurality of teeth that complement the gear surface of the protrusion of the pedal arm. The drive assembly further includes a magnet that moves when the gear moves based on the change in force applied to the pedal arm, such as by the user to the pedal pad.

The drive assembly is configured as a mechanical multiplier that moves the magnet at a larger angle than the pedal arm such that a Hall Effect sensor assembly may sense a larger change in position of the magnet compared to conventional systems where slight movements may not be sensed by the Hall Effect sensor. Further, this arrangement permits for a less complicated and more compact pedal assembly compared to conventional pedal assemblies. Further, the sensor assemblies provided herein may have better correlation because of reduced mechanical losses, and fewer possible failure modes that could result in total loss of sensing.

Various embodiments of pedal assemblies will be described in more detail herein.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

As used herein, "disposed on" means that a component is in direct contact with another component. A component "disposed on" or "disposed within" another component may be deposited, formed, placed, or otherwise applied directly onto/within the other component. In other words, if a component is disposed on a second component, there are no components disposed between the first component and the second component.

As used herein, the term "proximal" or "first end" means closer to or in the direction of an origin of an element, such as a link member. The term "distal" or "second end" means further from the origin of the element. Put another way, the terms "distal" or "second end" mean opposite to the proximal end or first end of an element.

Figure 1A:
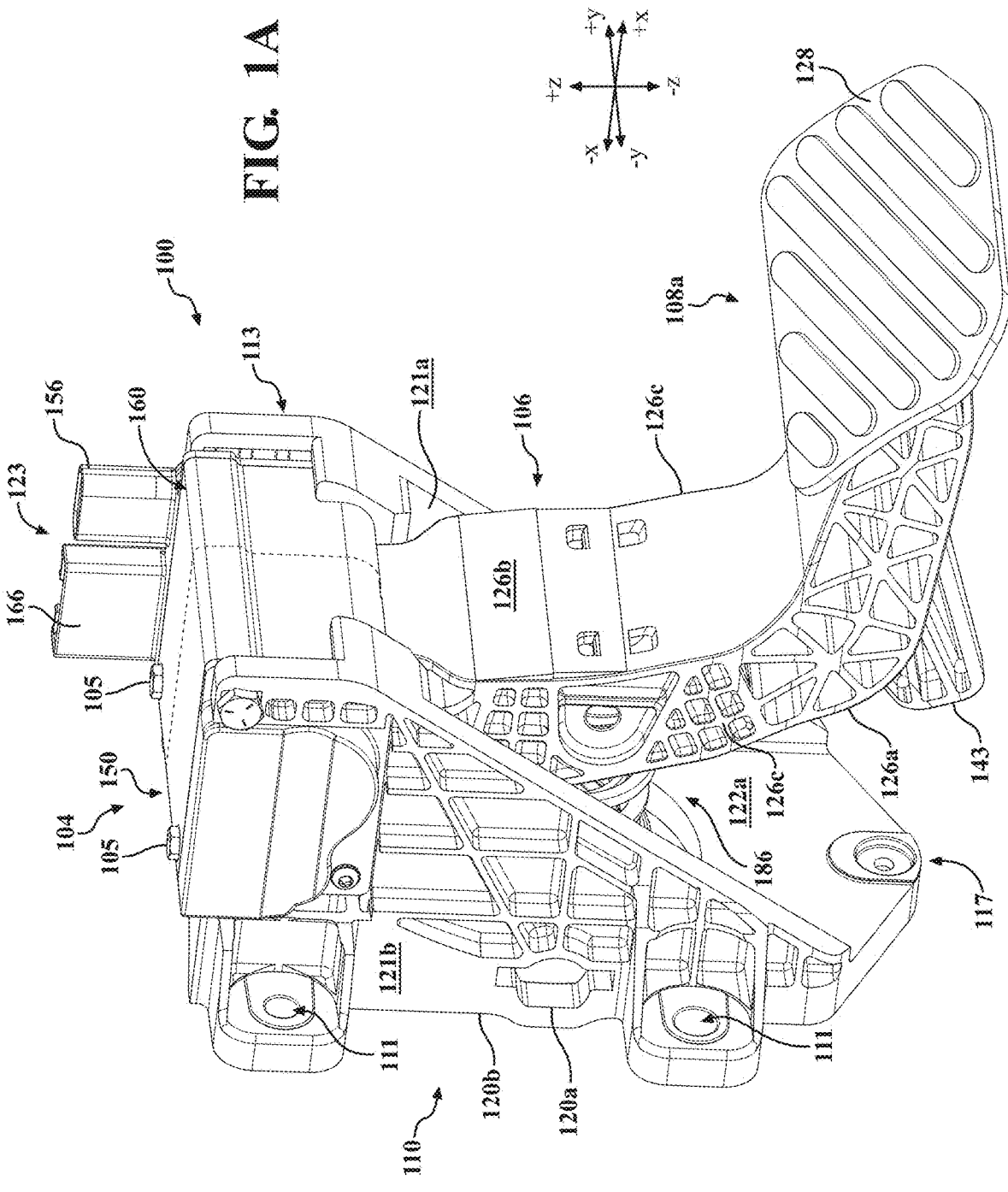
FIG. 1A schematically depicts a front and side perspective view of an example pedal assembly according to one or more embodiments shown and described herein.
Figure 1B:
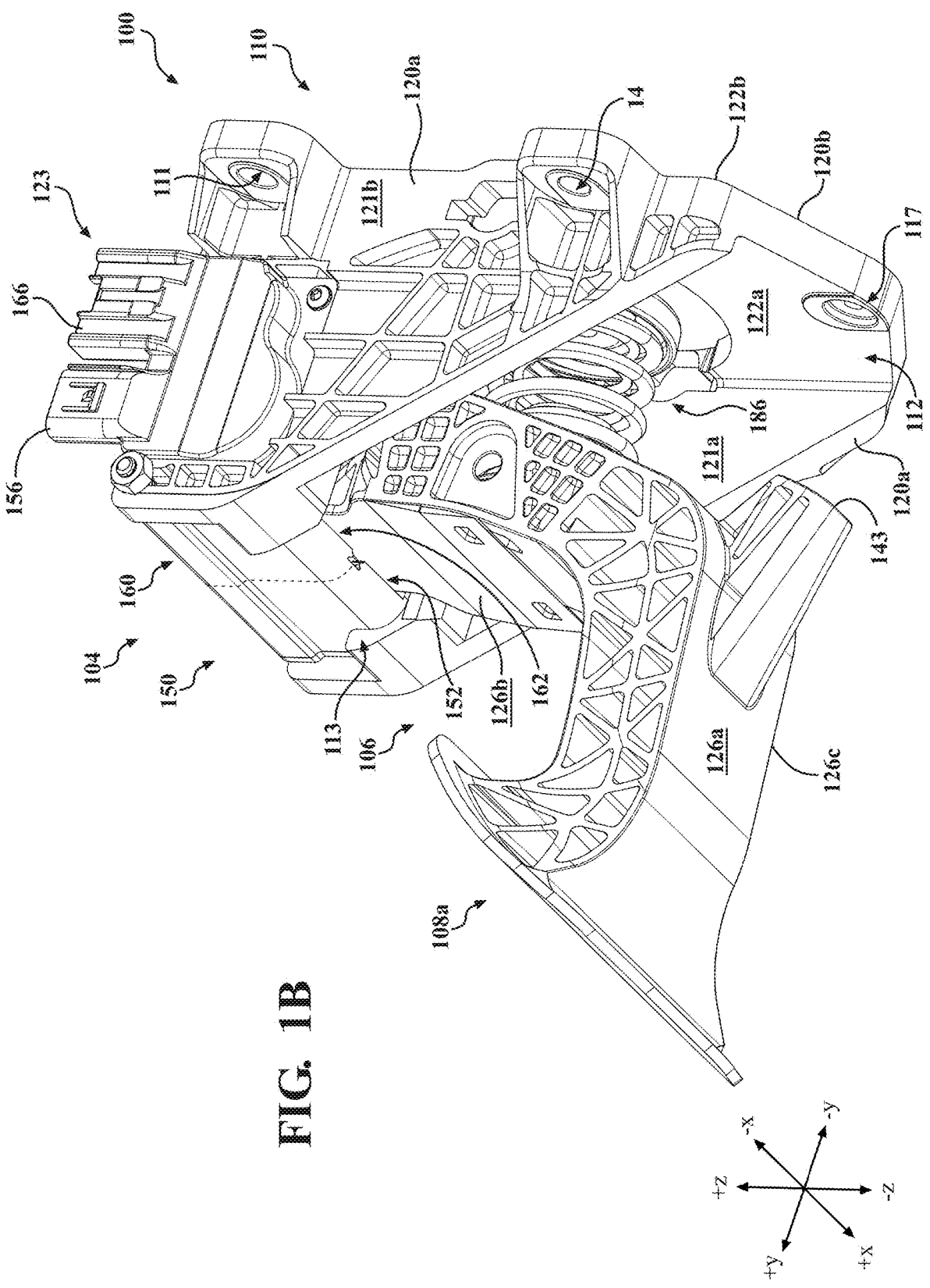
FIG. 1B schematically depicts a front and other side perspective view of the example pedal assembly of FIG. 1A according to one or more embodiments shown and described herein.

As used herein, the term "longitudinal direction" refers to the forward-rearward direction of the pedal assembly (i.e., in the +/−X-direction depicted in FIG. 1A). The term "lateral direction" refers to the cross-pedal assembly direction (i.e., in the +/−Y-direction depicted in FIG. 1A), and is transverse to the longitudinal direction. The term "vertical direction" or "up" or "above" refer to the upward-downward direction of the assembly (i.e., in the +/−Z-direction depicted in FIG. 1A).

Referring initially to FIGS. 1A-1B and 2-3, an example pedal assembly 100 is schematically depicted. The pedal assembly 100 may include a retaining assembly 104 and a housing 110. The housing 110 may be configured to removably mount to an external surface or other vehicle components, such as, but not limited to, an instrument panel (IP), a firewall, and/or the like. The housing 110 may be configured to mount to the external surface through a plurality of mounting apertures 111, each of the plurality of mounting apertures 111 sized to receive at least one fastener. For example, and without limitation, each of the plurality of mounting apertures 111 may receive a screw, rivet, bolt, adhesive, weld, hook and loop, and/or the like.

The retaining assembly 104 may be configured to be removably coupled to the housing 110, such as, in some embodiments, by slotting into a retaining recess 113 of the housing 110 that is configured to receive the retaining assembly 104. At least one fastener 105 may secure the retaining assembly 104 within the retaining recess 113 of the housing 110. The at least one fastener 105 may be a screw, rivet, bolt, adhesive, weld, hook and loop, and/or the like. As such, the retaining recess 113 of the housing 110 is sized and shaped to receive portions of the retaining assembly 104 to removable couple the retaining assembly 104 to the housing 110, as discussed in greater detail herein.

Still referring to FIGS. 1A-1B and 2-3, the retaining assembly 104 may include a first member 150 and a second member 160. In some embodiments, each of the first member 150 and the second member 160 may include at least one coupling bore 151, 161, respectively, to removably couple each of the first member 150 and the second member 160 to the housing 110. In a non-limiting example, the at least one fastener 105 may be positioned within the at least one coupling bore 151, 161, to releasably couple the each of the first member 150 and the second member 160 to the housing 110.

Figure 2:
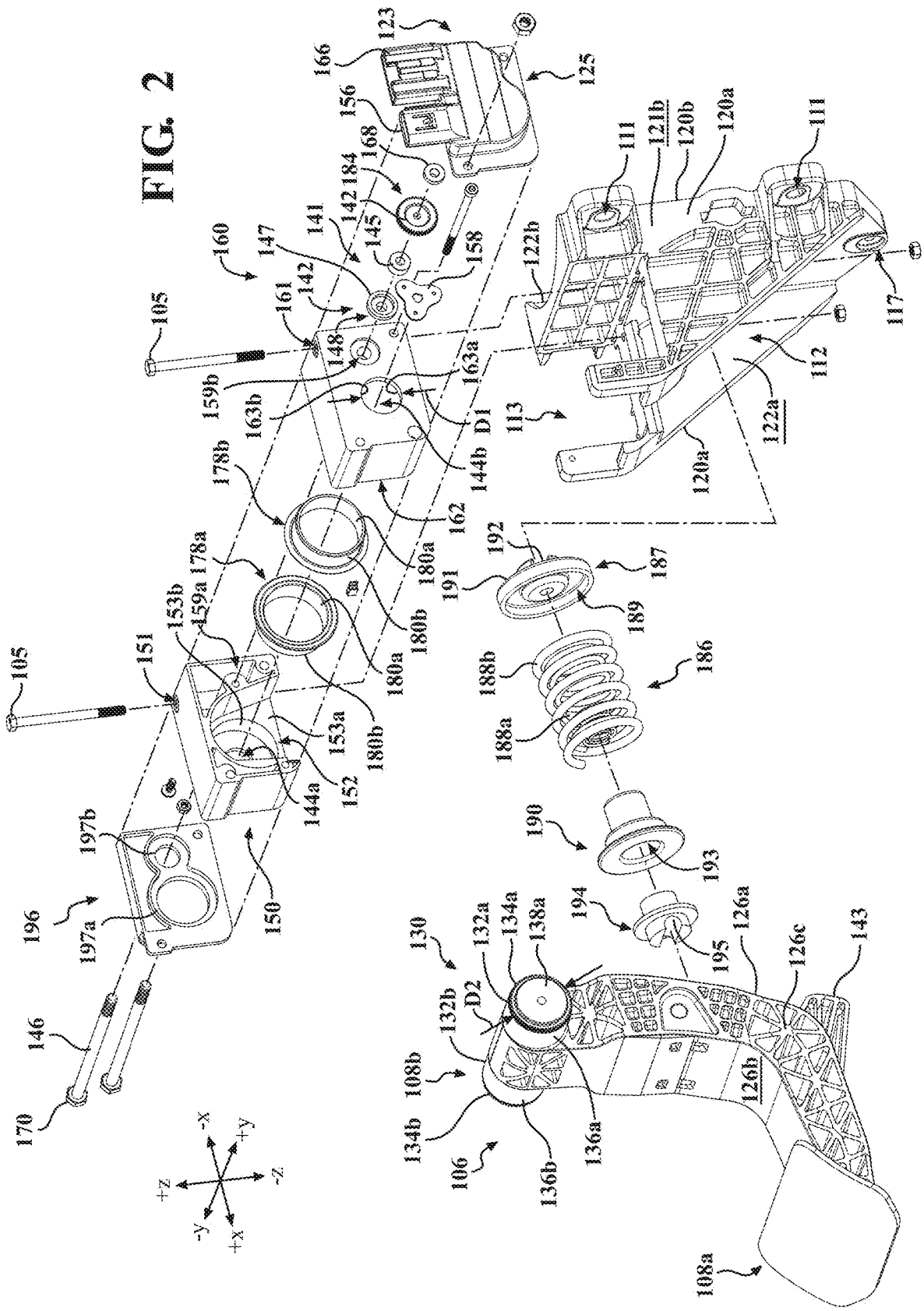
FIG. 2 schematically depicts an exploded view of the example pedal assembly of FIG. 1A according to one or more embodiments shown and described herein.

The example pedal assembly 100 may further include a pedal arm 106 and an emulator assembly 186 (FIG. 2) positioned within a cavity 112 of the housing 110 and extending between the pedal arm 106 and the housing 110, as best illustrated in FIG. 2. The cavity 112 of the housing 110 may be defined by a pair of sidewalls 120a that have an inner surface 121a and an opposite outer surface 121b and a rear wall 120b that has an interior surface 122a and an opposite exterior surface 122b.

The pedal arm 106 may include a pedal pad end 108a and an opposite coupling end 108b by which the pedal arm 106 is movably coupled to the housing 110, as discussed in greater detail herein. Further, the pedal arm 106 may be a monolithic structure that includes an innermost surface 126a and an opposite outermost surface 126b that is spaced apart by a pair of side surfaces 126c to define a thickness of the pedal arm 106. The pedal pad end 108a may be configured to receive a pedal pad 128.

As best illustrated in FIG. 2, the coupling end 108b of the pedal arm 106 may include a pair of pair of protrusions 130. One protrusion 132a of the pair of protrusions 130 extends from one side surface 126c of the pedal arm 106 and the other protrusion 132b of the pair of protrusions 130 extends from the other one side surface 126c of the pedal arm 106. As such, each of the protrusion 132a and the other protrusion 132b extend perpendicular to the innermost surface 126a and the outermost surface 126b of the pedal arm 106, such as in the lateral direction (e.g., in the +/−Y direction). This is non-limiting and the protrusions 132a, 132b may extend in any direction, at any angle, and not necessarily perpendicular to the innermost surface 126a and the outermost surface 126b of the pedal arm 106.

Each of the protrusions 132a, 132b may be tubular or cylindrical in shape, and include an outer surface 136a, 136b, respectively, although other shapes are contemplated. For example, and without limitation, frusto-variations thereof, elliptical, hexagonal, octagonal, and/or the like are contemplated. Each of the protrusions 132a, 132b may also include terminating surfaces 138a, 138b, respectively, that when received within a first receiving cavity 152 of the first member 150 and a second receiving cavity 162 of the second member 160 face an inner terminating surface 153a, 163a of the first receiving cavity 152 and the second receiving cavity 162, respectively, as discussed in greater detail herein. Further, the first receiving cavity 152 of the first member 150 and the second receiving cavity 162 of the second member 160 may be defined by a continuous wall surface 153b, 163b, which has a diameter D1 larger than a diameter D2 of each of the protrusions 132a, 132b, to receive a bushing 178a, 178b and the respective protrusion 132a, 132b, as discussed in greater detail herein.

Further, in the depicted embodiment, and as best illustrated in FIGS. 2, 4 and 7-10, each of the outer surfaces 136a, 136b of the protrusions 132a, 132b, respectively, include a geared surface portion 134a, 134b. That is, a plurality of teeth 140a, 140b extend from portions of the outer surfaces 136a, 136b near or adjacent to the terminating surfaces 138a, 138b, respectively, such that portions of the protrusions 132a, 132b may interact or engage with a gear 142 of a drive assembly 141, as discussed in greater detail herein. In some embodiments, the geared surface portion 134a, 134b may extend from the outer surfaces 136a, 136b in a vertical direction (i.e., in the +/−Z direction) and take on the shape of the protrusions 132a, 132b (e.g., tubular or cylindrical around a portion of the circumference of the outer surfaces 136a, 136b of the protrusions 132a, 132b in the depicted embodiment). This is non-limiting and the geared surface portion 134a, 134b may be positioned in any shape and positioned anywhere along the protrusions 132a, 132b.

In some embodiments, the geared surface portion 134a, 134b may be a single monolithic structure that is formed together with the protrusions 132a, 132b, such as by using injection molding techniques, additive manufacturing, and/or the like. Further, in other embodiments, only one of the protrusions 132a, 132b includes the geared surface portion 134a, 134b.

Referring to FIGS. 1A-1B, 2, 4-5B, and 7-10, the innermost surface 126a of the pedal arm 106 may further include and pedal arm stop 143. In some embodiments, the pedal arm stop 143 may protrude from a portion of the innermost surface 126a of the pedal arm 106 proximal to the pedal pad end 108a and distal to the coupling end 108b. In other embodiments, the pedal arm stop 143 may be positioned anywhere along the pedal arm 106. The housing 110 may further include a downstop 117 that may be opposed to the pedal arm stop 143 and may protrude from the housing 110. The downstop 117 may be positioned as least partially within a receiving recess of the housing 110 in a snap fit configuration. This is non-limiting and the downstop 117 may be coupled to the housing 110 using a fastener such as, without limitation, a screw, bolt, rivet, weld, epoxy, adhesive, and/or the like. The downstop 117 may be formed by a receiving cavity in some embodiments, and/or by a resilient material in other embodiments, such as, without limitation, rubber, silicone, and the like. Accordingly, the pedal arm stop 143 may be configured to contact the downstop 117 at the maximum travel position of the pedal arm 106, thereby defining a maximum travel of the pedal arm 106 along a depression travel arc. In some embodiments, the downstop 117 may compress a predetermined amount thereby providing an additional pedal effect force felt by the driver in addition to the emulator assembly 186, until the maximum travel of the pedal arm 106 is reached thus maximizes the pedal effort force.

That is, the pedal arm stop 143 and the downstop 117 may define the maximum travel position from a resting position (e.g., no user applied force onto the pedal pad 128) of the pedal arm 106 along the depression travel based on an amount of force applied by the user onto the pedal pad 128 until the maximum travel position is achieved (i.e., the pedal arm stop 143 abuts with the downstop 117).

It should be understood that the protrusions 132a, 132b, as well as any of the other portions or components of the protrusions 132a, 132b and the pedal arm 106 may be integrated with one another, (i.e., may be a single monolithic structure that is formed together), such as by using injection molding techniques, additive manufacturing, and/or the like.

As used herein, "additive manufacturing" refers generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt base superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Figure 5A:
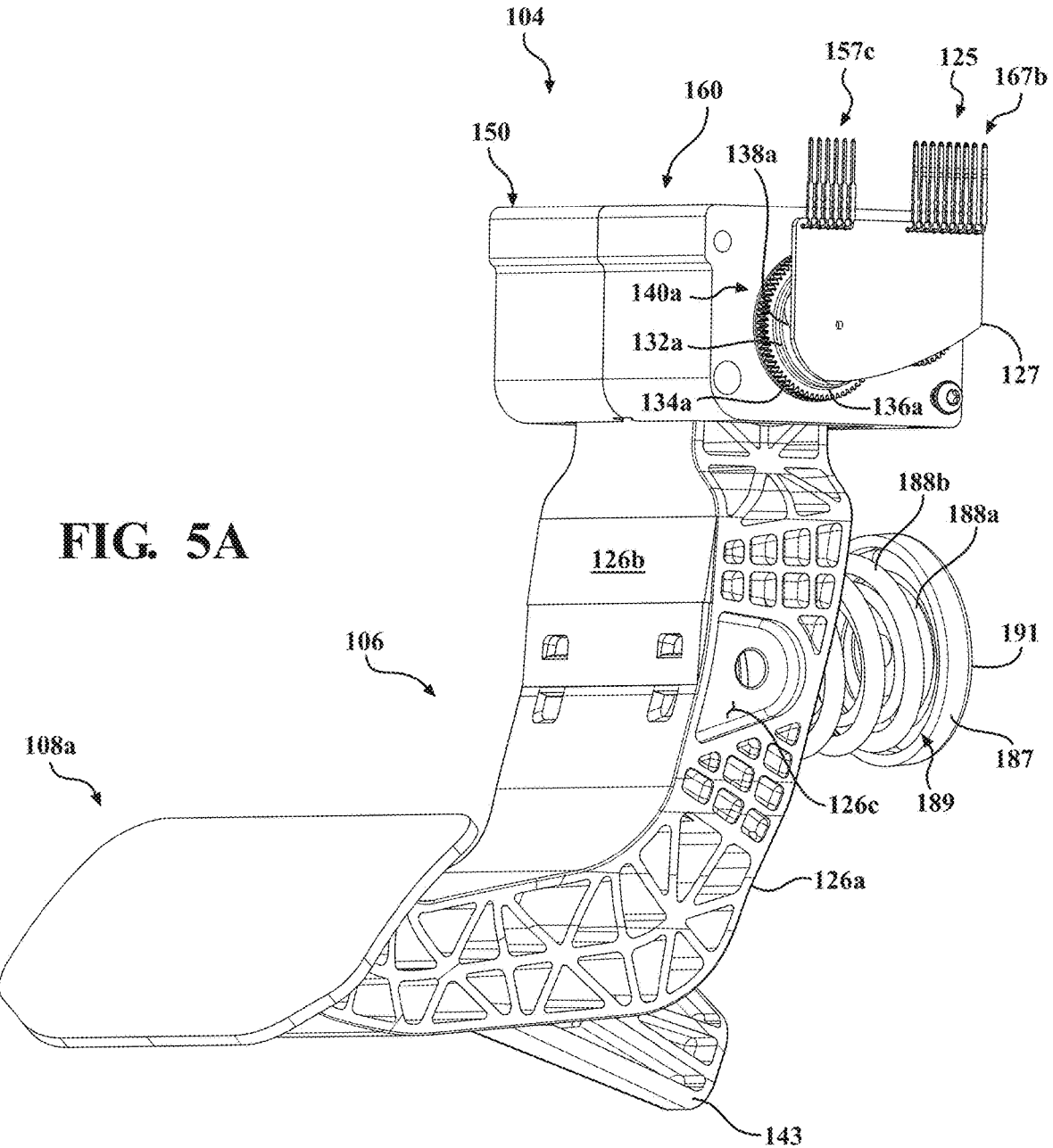
FIG. 5A schematically depicts an isolated partial side perspective view of portions of the example pedal assembly of FIG. 1A according to one or more embodiments shown and described herein.
Figure 5B:
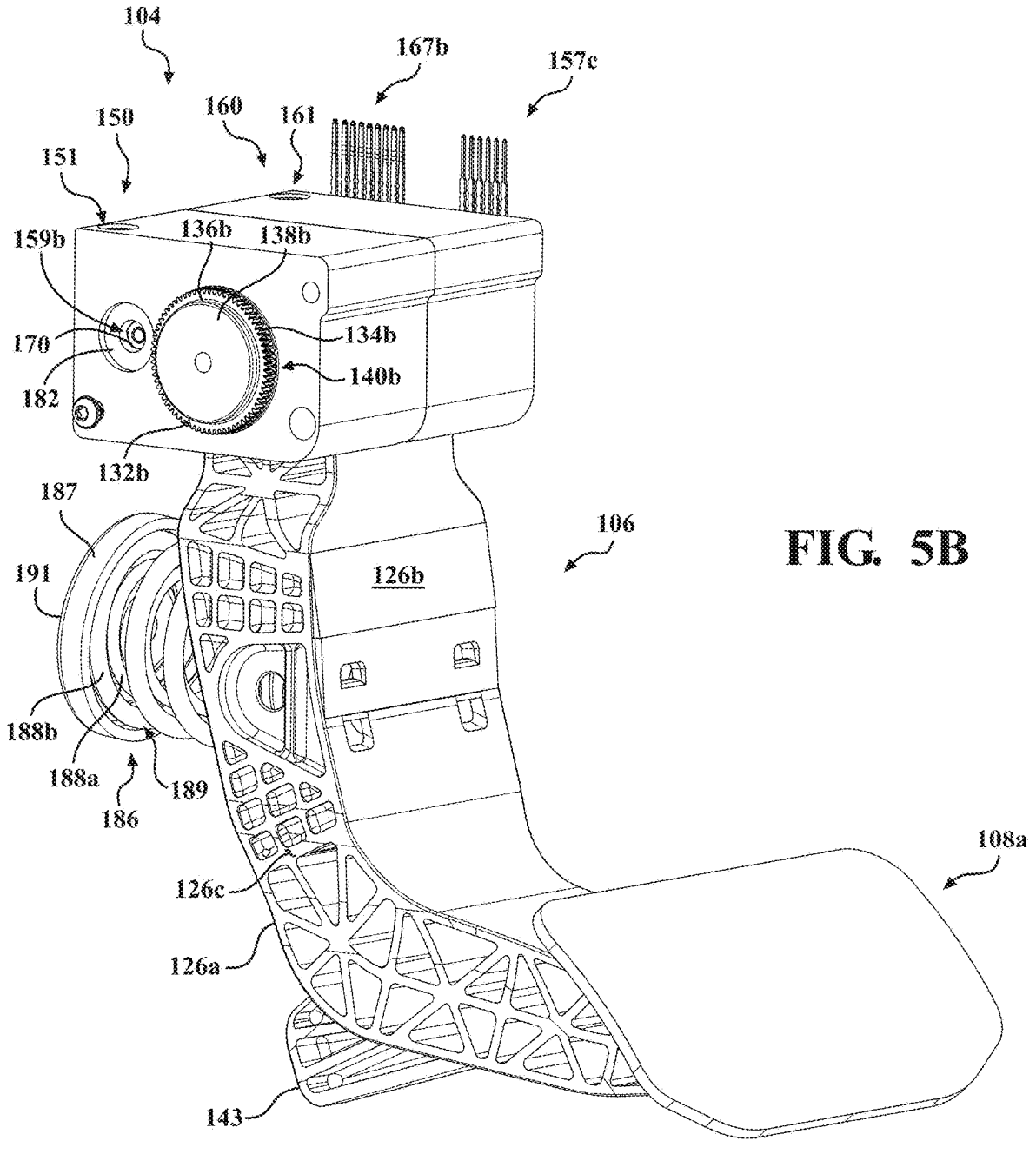
FIG. 5B schematically depicts an isolated partial other side perspective view of portions of the example pedal assembly of FIG. 5A according to one or more embodiments shown and described herein.

Now referring to FIG. 2, the first member 150 and the second member 160 may include the first receiving cavity 152 and the second receiving cavity 162, respectively. The receiving cavities 152, 162 are configured to receive portions of the protrusions 132a, 132b of the pedal arm 106 in the first member 150 and the second member 160, respectively, as described in further detail below. Further, each of the first member 150 and the second member 160 may include openings 144a, 144b, respectively, that is positioned within the continuous wall surface 153b, 163b, of the first receiving cavity 152 and the second receiving cavity 162 of the first member 150 and the second member 160, respectively. Each of the openings 144a, 144b are configured to receive the terminating surfaces 138a, 138b and the geared surface, respectively. That is, each opening 144a, 144b is a through bore from the first receiving cavity 152 and the second receiving cavity 162, respectively, to provide access externally, or beyond the first member 150 and the second member 160, respectively in the lateral direction (i.e., in the +/−Y direction). Portions of the protrusions 132a, 132b are received within the openings 144a, 144b such that the terminating surfaces 138a, 138b, and the geared surface portions 134a, 134b are positioned to extend through the first member 150 and the second member 160 to be external to the first member 150 and the second member 160 (e.g., external to the first receiving cavity 152 and the second receiving cavity 162) in the lateral direction (i.e., in the +/−Y direction), as best illustrated in FIGS. 5A-5B.

Referring back to FIGS. 2 and 4, each of the bushings 178a, 178b, have an inner surface 180a and an opposite outer surface 180b is configured to movably engage with the first receiving cavity 152 and the second receiving cavity 162, respectively and the outer surface 136a, 136b of the protrusions 132a, 132b, respectively. That is, the inner surface 180a of the bushing 178a, 178b, is configured to engage with the outer surface 136a, 136b of the protrusions 132a, 132b, respectively, and the outer surface 180b of the bushings 178a, 178b, are configured to engage with the continuous wall surface 153b, 163b, of the first receiving cavity 152 and the second receiving cavity 162 of the first member 150 and the second member 160, respectively. As such, the bushings 178a, 178b provide a barrier to contact with the continuous wall surface 153b, 163b, of the first receiving cavity 152 and the second receiving cavity 162 of the first member 150 and the second member 160, respectively, for the protrusions 132a, 132b, respectively and may assist in aligning the protrusions 132a, 132b in the openings 144a, 144b, respectively.

Figure 3:
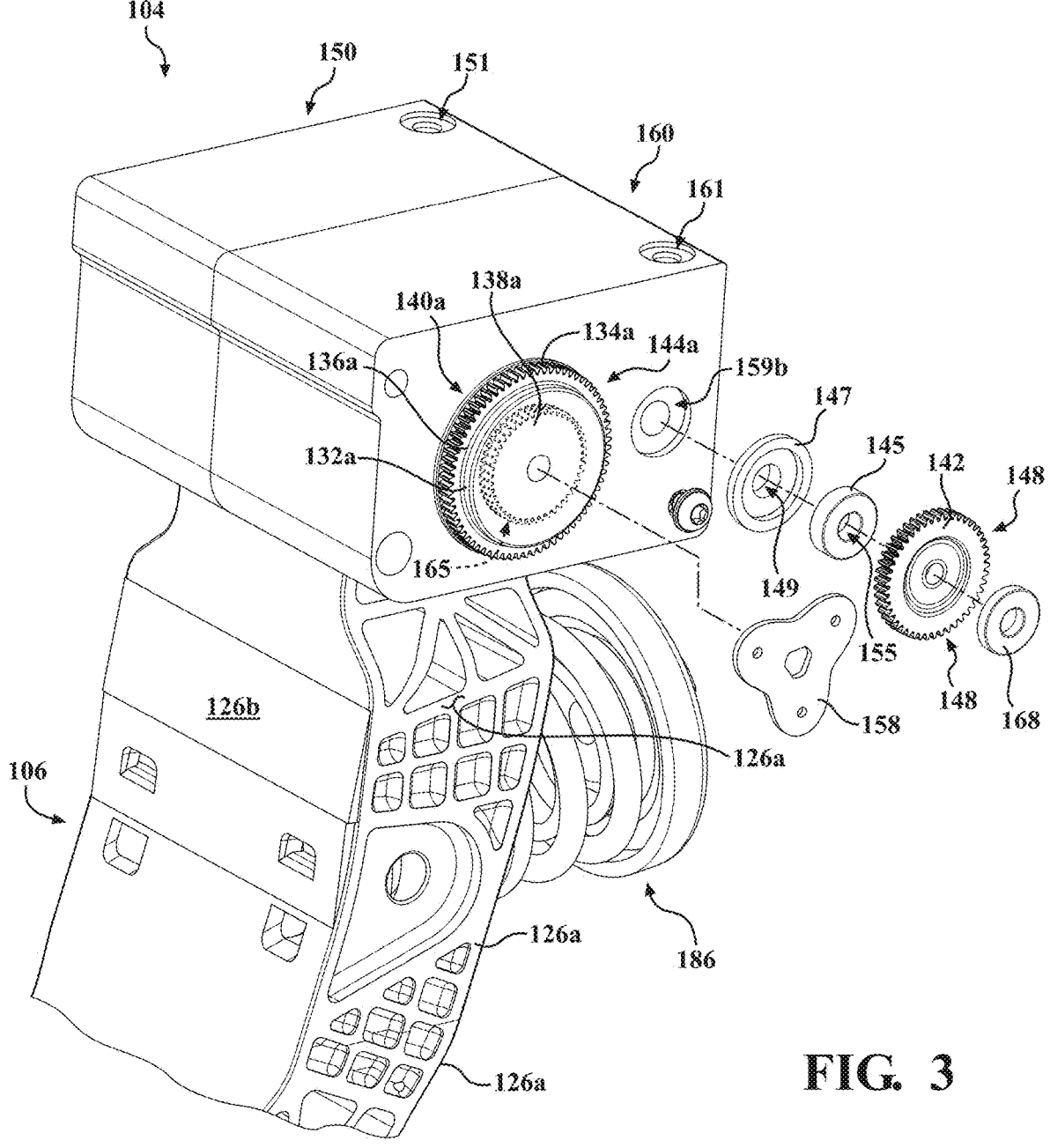
FIG. 3 schematically depicts an isolated partial exploded view of the example pedal assembly of FIG. 1A according to one or more embodiments shown and described herein.
Figure 4:
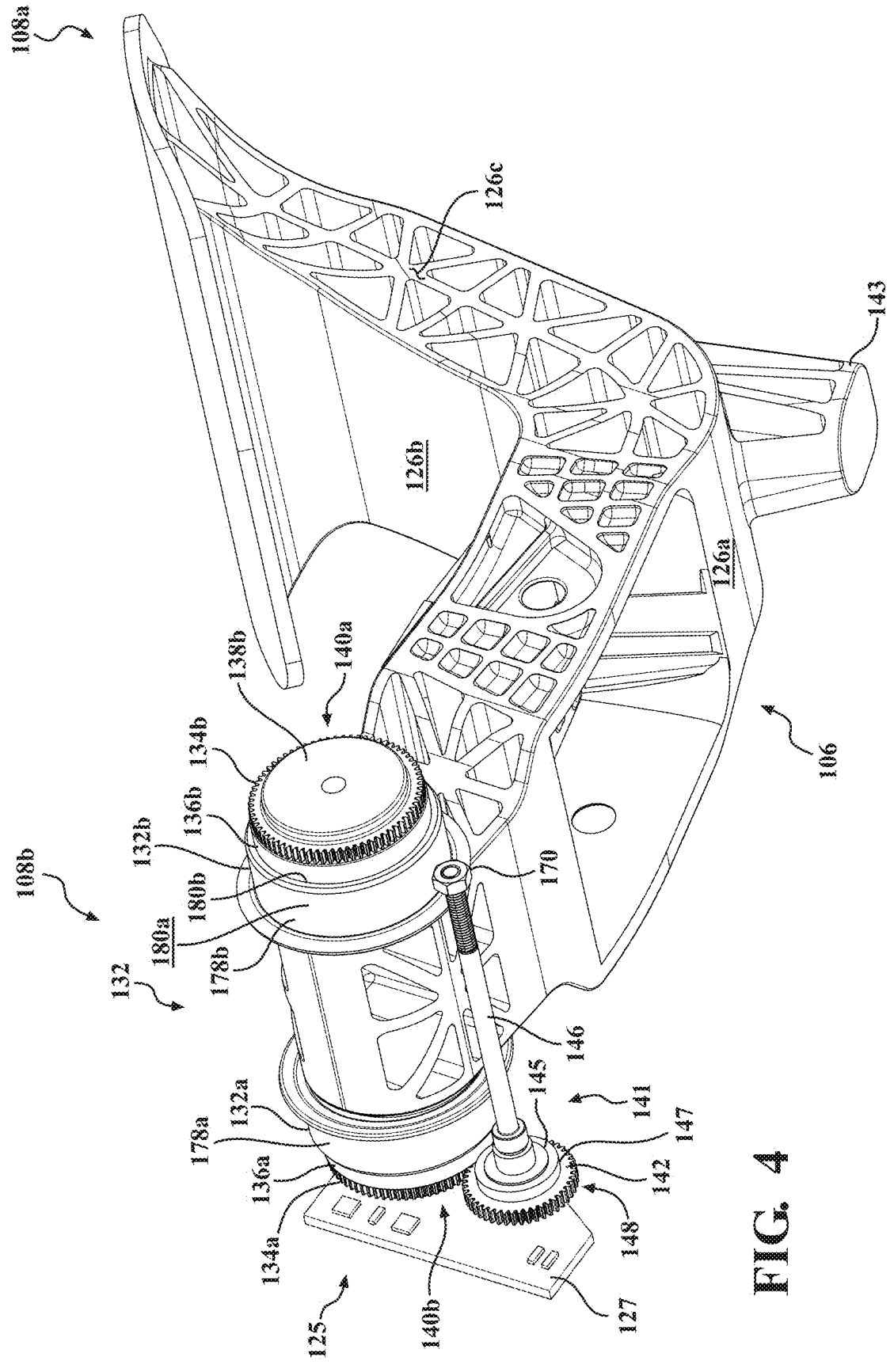
FIG. 4 schematically depicts a partial isolated view of a drive assembly of the example pedal assembly of FIG. 1A according to one or more embodiments shown and described herein.

Referring now to FIGS. 2-4, the drive assembly 141 includes an elongated member 146, a bushing 145, a receiver member 147, and the gear 142 coupled thereto. The gear 142 may be a spur gear. The gear 142 includes a plurality of external teeth 148 that are sized and pitched to compliment the geared surface portion 134a, 134b of the protrusions 132a, 132b, respectively. Each of the first member 150 and the second member 160 include a second opening 159a, 159b that is configured to receive a portion of the elongated member 146 such that the elongated member 146 may be movably coupled to the first member 150 and the second member 160 while at least partially positioned within the first receiving cavity 152 and the second receiving cavity 162 and extending between the first member 150 and the second member 160 in the lateral direction (i.e., in the +/−Y direction). That is, each second openings 159a, 159b is a through bore from the first receiving cavity 152 and the second receiving cavity 162, respectively, which provide access from the first receiving cavity 152 and the second receiving cavity 162 externally out of the respective cavity, or beyond the first member 150 and the second member 160, respectively.

Further, each of the first member 150 and the second member 160 may include a recess 182 to movably house the receiver member 147 external to the first receiving cavity 152 and the second receiving cavity 162. The receiver member 147 includes a bore 149 configured to receive at least a portion of the elongated member 146 and/or portions of the gear 142, such as the shaft of the gear 142. The receiver member 147 is sized and shaped to receive the bushing 145 and to be received by the recess 182, such as in a snap fit, friction fit, or other engagement appreciated by those having skill in the art. The bushing 145 further includes a bore 155 that is configured to receive portions of the elongated member 146 and/or portions of the gear 142 such as the shaft of the gear 142.

The recess 182 is configured to align the depth and positioning of the gear 142 to correspond to the depth and positioning of the geared surface portion 134a, 134b, of the protrusions 132a, 132 in the longitudinal direction (i.e., in the +/−X direction), in the lateral direction (i.e., in the +/−Y direction), and/or in the vertical direction (i.e., in the +/−X direction), respectively. As depicted, only recess 182 of one of the first member 150 and the second member 160 may include or receive the receiver member 147, although both the first member 150 and the second member 160 may include the recess 182 to house the receiver member 147. The other one of the recess 182 may receive a head portion 170 of the elongated member 146. The head portion 170 may be a nut or other fastening component that is coupled or otherwise independently engaged with the elongated member 146. The gear 142 may further include a receiving void 184 positioned on an opposite side as the bushing 145 and the receiver member 147 and is configured to receive a magnet 168 such that the magnet 168 is configured to move when the gear 142 moves, as discussed in greater detail herein.

Now referring to FIGS. 2-3, 5A and 6, a sensing assembly 125 will now be discussed. The sensing assembly 125 includes a first sensor assembly 154 and a second sensor assembly 164 respectively. The first sensor assembly 154 and the second sensor assembly 164 may have portions of the sensing assembly coaxially aligned with the one protrusion 132a, and with the gear 142, respectively, to measure movement of pedal arm 106, as described in further detail herein.

Figure 6:
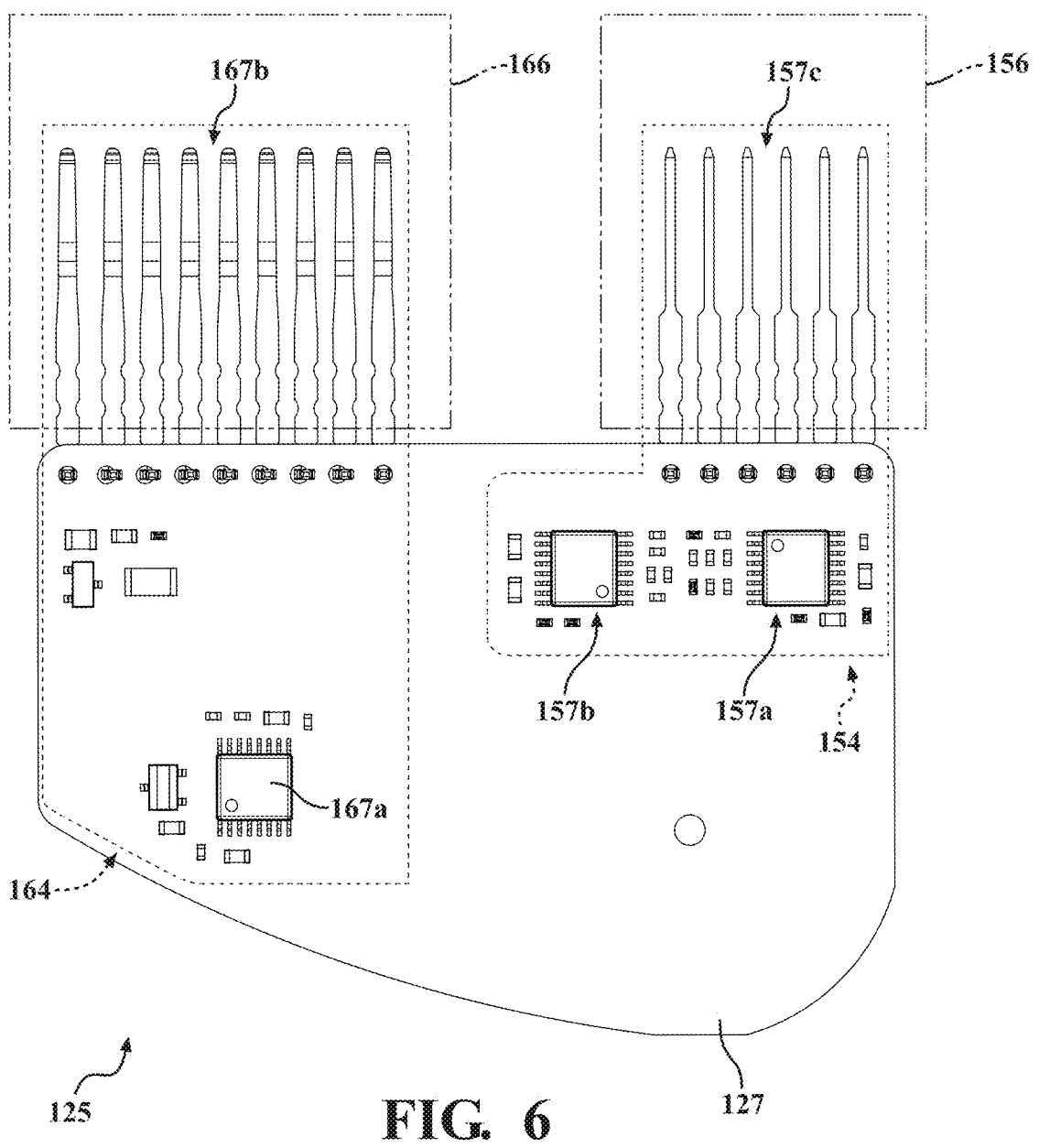
FIG. 6 schematically depicts a partial isolated side view of a sensing assembly of the example pedal assembly of FIG. 1A according to one or more embodiments shown and described herein.
Figure 7:
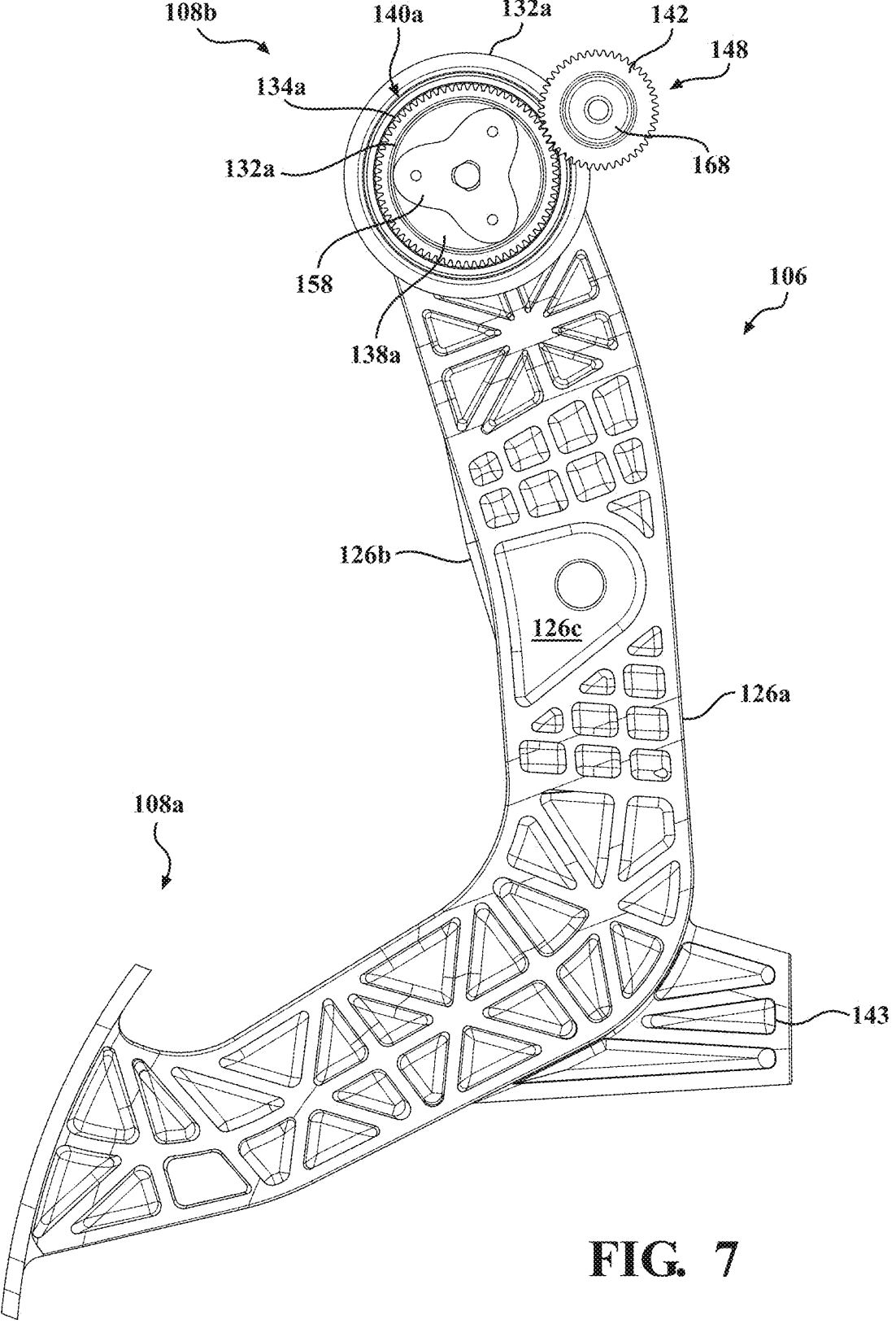
FIG. 7 schematically depicts a partial isolated side view of a pedal arm and a drive assembly of the example pedal assembly of FIG. 1A according to one or more embodiments shown and described herein.
Figure 8:
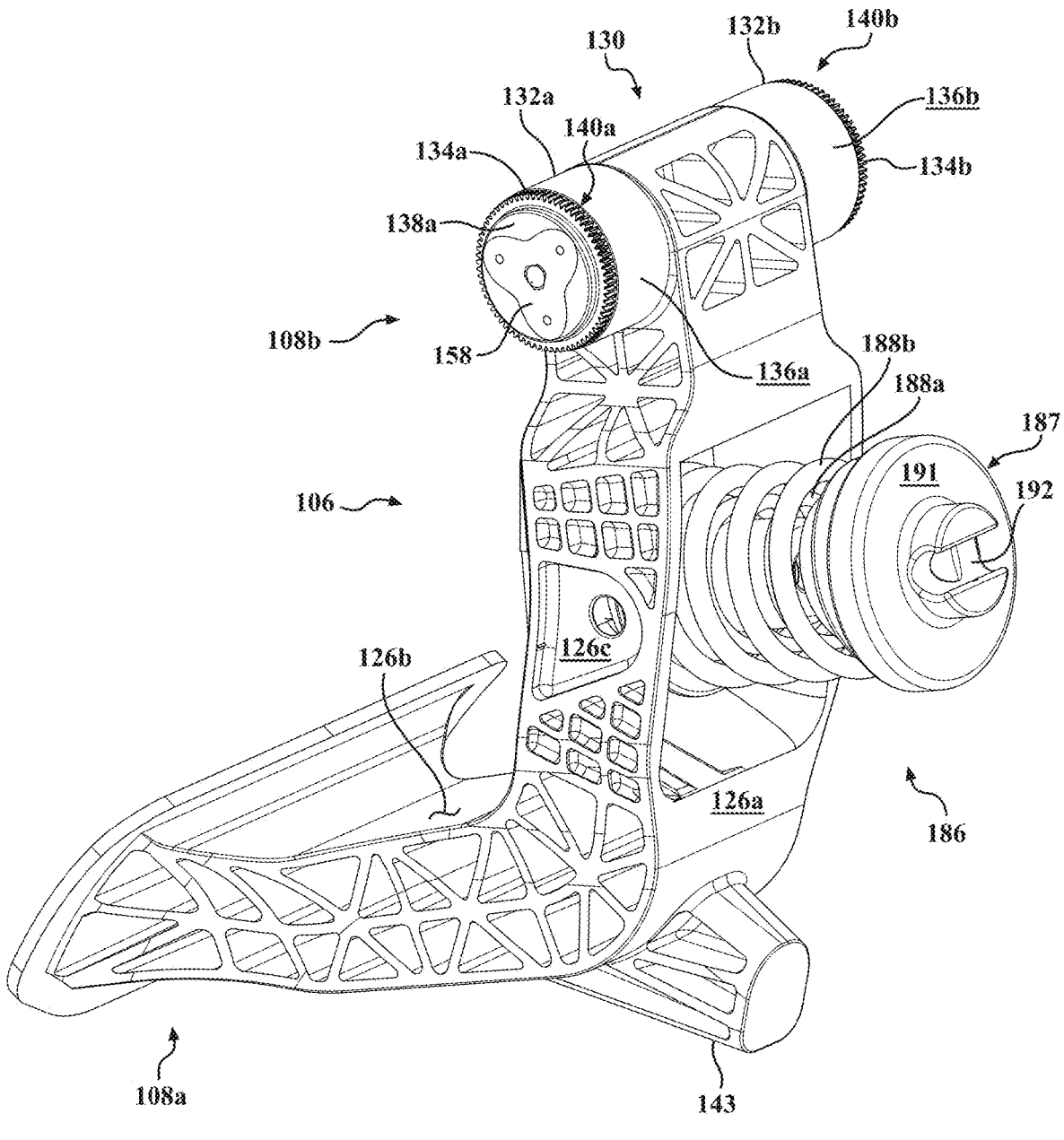
FIG. 8 schematically depicts a partial isolated side and rear perspective view of a pedal arm and an emulator assembly of the example pedal assembly of FIG. 1A according to one or more embodiments shown and described herein.
Figure 9A:
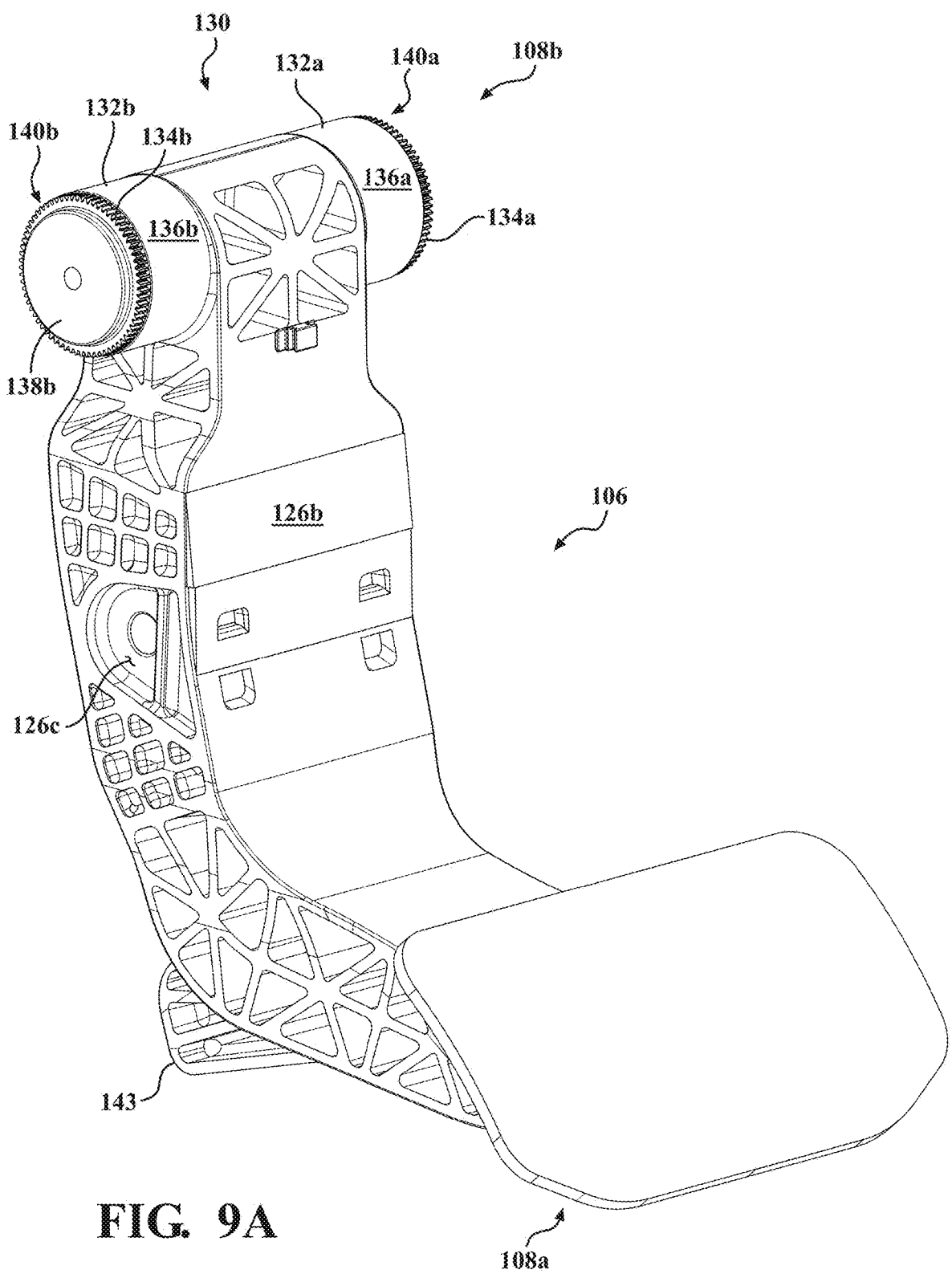
FIG. 9A schematically depicts a partial isolated side and front perspective view of a pedal arm of the example pedal assembly of FIG. 1A according to one or more embodiments shown and described herein.
Figure 9B:
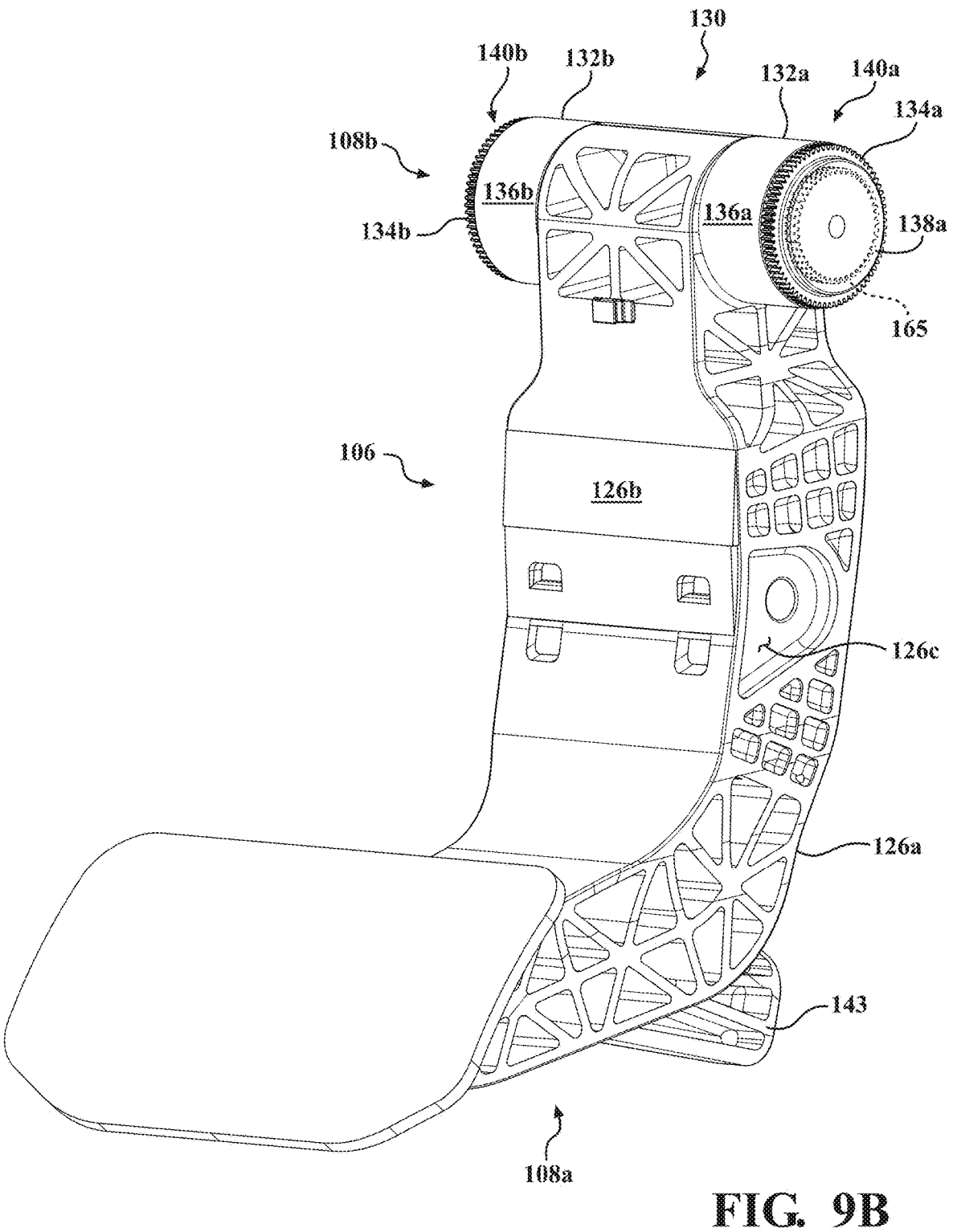
FIG. 9B schematically depicts a partial isolated other side and front perspective view of the pedal arm of FIG. 9A according to one or more embodiments shown and described herein.
Figure 10:
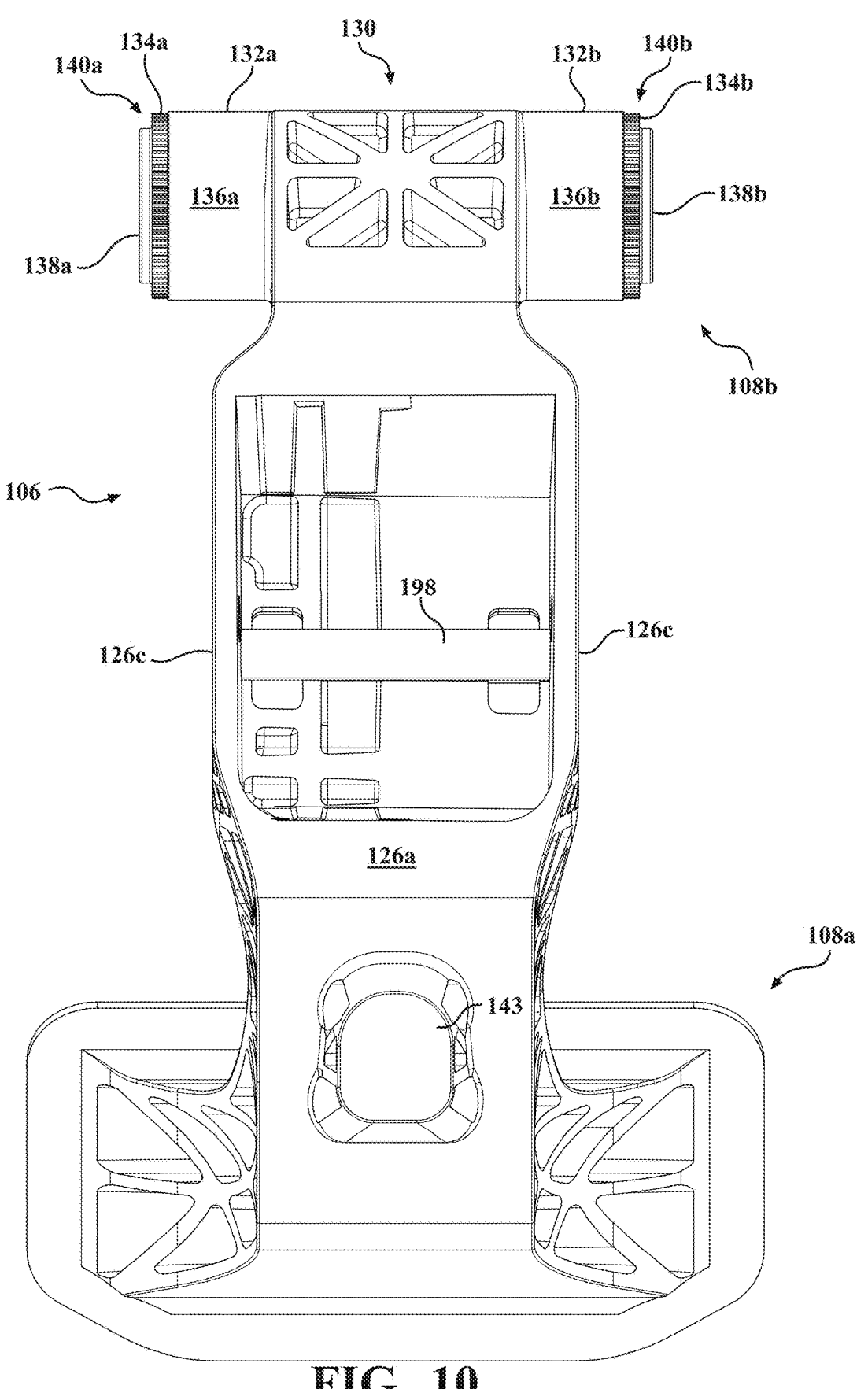
FIG. 10 schematically depicts an isolated rear view of a pedal arm of the example pedal assembly of FIG. 1A according to one or more embodiments shown and described herein.

As best depicted in FIG. 6, the sensing assembly 125 includes a circuit board 127, such as a printed circuit board. The first sensor assembly 154 may be an inductive type sensor that includes at least one receiver coil 157a, a transmitter coil 157b, and a plurality of terminal pins 157c extending therefrom. A coupler 158 may be mounted, attached or otherwise received within a predetermined groove 165 that is sized and shape to match the coupler 158 on the terminating surface 138a of the protrusion 132a to assist in retaining the position of the coupler 158 relative to the terminating surface 138a of the protrusion 132a.

In other embodiments, the terminating surface 138a may include a plurality of resilient members, or other methods appreciated by those having skill in the art that are configured to preload the coupler 158, or a housing therefor, via a biasing effect, toward the first sensor assembly 154 in at least the lateral direction (i.e., in the +/−Y direction) to control an air gap between the coupler 158 and the first sensor assembly 154 (e.g., transmitter coil 157b and at least one receiver coil 157a). In some embodiments, the air gap is a predetermined space or gap based on the preload of the plurality of resilient members, or other methods, between the coupler 158 and the first sensor assembly 154, and/or based on the depth of the predetermined groove 165. In other embodiments, the air gap is dynamic based on a number of factors including wear on the coupling end 108b.

In some embodiments, the coupler 158 or components thereof, may be keyed to couple or otherwise lock or attach the coupler 158 to the terminating surface 138a of the protrusion 132a such that as the protrusion 132a moves, the coupler 158 also simultaneously moves. In other embodiments, the coupler 158 may be coupled to the protrusion 132a in a friction fit, a tapered fit, spring-loaded features, and/or the like, to maintain the air gap and such that as the protrusion 132a moves, the coupler 158 also simultaneously moves.

In the assembled state, the coupler 158 may be positioned adjacent to the at least one receiver coil 157a. In some embodiments, the coupler 158 may include distinct lobes, such as three lobes as illustrated in FIG. 3. This is non-limiting and the coupler 158 may have more or less lobes, be circular, or other shapes, such as a half-moon, square, rectangular, and/or the like. The coupler 158 may move dependent on the pressure applied to the pedal pad 128 of the pedal arm 106, as discussed in greater detail herein.

The at least one receiver coil 157a and the transmitter coil 157b work in tandem such that the at least one receiver coil 157a detects movements of the coupler 158, which is then transmitted via the plurality of terminal pins 157c through a vehicle side controller communicatively coupled to the plurality of terminal pins 157c positioned within a connector housing 156 to a vehicle side electronic control unit and/or powertrain controller.

In some embodiments, portions of the first sensor assembly 154 may be overmolded into a connector assembly 123 to encapsulate and protect the one or more sensor components and may be used to position the components spaced apart from the first member 150 and/or the protrusion 132a. In other embodiments, the overmold is coupled to the first member 150 via at least one fastener, such as, without limitation, a screw, bolt and nut, rivet, adhesive, weld, epoxy, hook and loop, and/or the like.

Still referring to FIGS. 2-3, 5A and 6, the second sensor assembly 164 may be a Hall Effect type sensor. Optionally, the second sensor assembly 164 may include components mounted to the circuit board 127 and a connector housing 166. As such, the circuit board 127 houses different components for both the first sensor assembly 154 and the second sensor assembly 164. The second sensor assembly 164 may include at least one Hall Effect chip 167a and a plurality of terminal pins 167b extending therefrom. The magnet 168 may be positioned to be spaced apart from and coaxially aligned with the at least one Hall Effect chip 167a. As such, portions of the gear 142 may also be spaced apart from and coaxially aligned with the at least one Hall Effect chip 167a.

In some embodiments, the air gap between the magnet 168 and the at least one Hall Effect chip 167a is a predetermined space or gap based on a preload of magnet 168 positioned within the recess 182 of the gear 142. In other embodiments, the air gap is dynamic based on a number of factors including wear on the coupling end 108b, wear on the gear 142, and the like. In some embodiments, the magnet 168 is keyed to couple or otherwise lock or attach to the receiving recess 182 of the gear 142 such that as the gear 142 moves, the magnet 168 also simultaneously moves. In other embodiments, the magnet 168 may be coupled to the receiving recess 182 of the gear 142 in a friction fit, a tapered fit, spring-loaded features, and/or the like, to maintain the air gap and such that as the gear 142 moves, the magnet 168 also simultaneously moves.

As such, the second sensor assembly 164 utilizes Hall Effect sensing technologies to detect movement of the gear 142. The at least one Hall Effect chip 167*a* is sensitive to a Hall Effect detection of magnetic change, and to convert a displacement or angular measurement of the magnet 168, to an electronic or electromagnetic signal. This information is transmitted through the plurality of terminal pins 167*b* positioned within the connector housing 166 and to the vehicle side electronic control unit and/or the powertrain controller for processing. The magnet 168, may be any target that can change or manipulate a magnetic field and is not limited to a magnet. Further, the magnet 168 may be sized and shaped to be positioned on, near or adjacent to the gear 142, which is adjacent or near the protrusion 132*a* and adjacent to the at least one Hall Effect chip 167*a*. In some embodiments, the magnet 168 may be generally circular. In other embodiments, the magnet 168 may be a plurality of other shapes, such as rectangular, square, hexagonal, octagonal, and/or the like. The magnet 168 may move with the gear dependent on the amount of pressure change (applied or released) to/from the pedal pad 128 of the pedal arm 106, as discussed in greater detail herein.

The drive assembly 141 is configured as a mechanical multiplier that moves the magnet 168 at a larger angle than the pedal arm 106 such that second sensor assembly 164 may sense a larger change in position of the magnet 168 compared to conventional systems where slight movements may not be sensed by the at least one Hall Effect chip 167*a*. Further, this arrangement permits for a less complicated and more compact pedal assembly compared to conventional pedal assemblies. Further, the sensor assemblies provided herein may have better correlation because of reduced mechanical losses, and fewer possible failure modes that could result in total loss of sensing.

In some embodiments, the portions of the second sensor assembly 164 may also be overmolded to form the connector assembly 123 to encapsulate and protect the one or more sensor components and may be used to couple the second sensor assembly 164 to the first member 150 as discussed above. As discussed above, in other embodiments, the overmold may also be coupled directly to the first member 150 via at least one fastener, such as, without limitation, a screw, bolt and nut, rivet, adhesive, weld, epoxy, hook and loop, and/or the like.

It should be understood that the first sensor assembly 154 and the second sensor assembly 164 utilize different sensing technologies to simultaneously measure the movement of the coupling end 108*b* of the pedal arm 106 such that redundant sensing via the two different sensing technologies may occur. Further, because the redundant sensing described herein uses different sensing techniques, such an arrangement provides for a more robust redundant sensing compared to conventional systems.

Each of the first and second sensor assemblies 154, 164 may also include a wake-up circuity that sends a signal on a detection of movement of the pedal arm 106 to initiate sensing of both the first sensor assembly 154 and the second sensor assembly 164. Further, the signal may be used by the vehicle side for a variety of functions such as, without limitation, initiating or "waking up" an electronic control unit.

Referring back to FIG. 2, opposite of the connector assembly 123 (e.g., external to the first member 150 in the lateral direction (i.e., in the +/−Y direction) is a second housing 196. The second housing 196 may be overmolded to include recesses 197*a*, 197*b* configured to receive the terminating surface 138*b* of the protrusion 132*b* and portions of the head portion 170 of the elongated member 146, respectively. Further, in embodiments, the second housing 196 may be configured to be coupled or attached to the first member 150 to enclose or cover opening 144*b* and opening 159*b*. It should be understood that the second housing 196 is interchangeable and may be moved to be coupled to the second member 160 and the sensing assembly 125, the drive assembly 141 and the connector housing 123 be inverted or revered to be the first member 150.

In operation, based on a force applied to the pedal pad 128, the coupling end 108*a* of the pedal arm 106 moves or rotates with respect to the retaining assembly 104, which in turn rotates the coupler 158 to change or modify eddy currents, which is detected by the first sensor assembly 154 to sensor or detect the travel or movement (e.g., rotational, linear, and/or the like) of the coupler 158 (and the coupler end 108*b* of the pedal arm 106, which has a direct correlation to an amount of change in force applied to the pedal pad 128). Simultaneously, an input side of the drive assembly 141 (e.g., the gear 142 that includes the plurality of external teeth 148) is moved or rotated, which drives or moves the gear 142 at a multiplied angle (e.g., in a non-limiting example, a 2 to 1 ratio where the magnet 168 rotates 2 degrees for every one degrees of movement of the pedal arm 106). The second sensor assembly is configured to detect the movement of the magnet 168 embedded within the gear 142 to sense or detect the travel or movement (e.g., rotational, linear, and/or the like) of the magnet 168 (and the coupler end 108*b* of the pedal arm 106, which has a direct correlation to an amount of change in force applied to the pedal pad 128).

As such, the first sensor assembly 154 and the second sensor assembly 164 independently sense the movement, such as angular movement, of the coupler end 108*b* of the pedal arm 106. Further, the drive assembly 141 is configured to move the gear 142 at a multiplied angle when compared to the coupler end 108*b*. This multiplied angle permits for a more accurate sensing of the magnet 168 and movement thereof. These two sensed detections by the first sensor assembly 154 and the second sensor assembly 164 are communicated to a vehicle side electronic control unit via the terminal pins 157*c*, 167*b*, respectively.

Referring back to FIGS. 1-3, 5A-5B, and 8, the example pedal assembly 100 may further include the emulator assembly 186 for providing a pedal effort force and for biasing the pedal arm 106 to the resting position (e.g., home position without any external force applied to the pedal pad 128 by the user). The emulator assembly 186 may include an emulator assembly housing 187, at least one biasing member, depicted as a pair of biasing members 188*a*, 188*b* positioned to be received within a cavity 189 defined by the emulator assembly housing 187, and an elongated member 190 coupling the elongated member 190 to the innermost surface 126*a* of the pedal arm 106. The elongated member 190 of the emulator assembly 186 may be configured to provide a biasing force, provided via at least one of the biasing members 188*a*, 188*b* against the depression travel arc when the force is applied at the pedal pad end 108*a*.

The emulator assembly housing 187 may engage with the interior surface 122*a* of the rear wall 120*b* of the housing 110. An outer surface 191 of the emulator assembly housing 187 may further include at least one groove 192 that receives a protrusion of the housing 110 to engage or otherwise couple the emulator assembly housing 187 to the interior surface 122a of the rear wall 120b of the housing 110. Further, the elongated member 190 may receive at least one coupling member 194 within a receiving bore 193 of the elongated member 190. The coupling member 194 may include a groove 195 configured to abut, couple, or otherwise engage with a protrusion 198 (FIG. 10) of the innermost surface 126a of the pedal arm 106. As such, the coupling member 194 may be coupled to the elongated member 190 such that the groove 195 of the coupling member 194 engages with the protrusion 198 extending from innermost surface 126a of the pedal arm 106.

In some embodiments, the at least one biasing member is depicted as the pair of biasing members 188a, 188b positioned to be received within the cavity 189 defined by the emulator assembly housing 187 and extending between the elongated member 190 and the emulator assembly housing 187. Each of the pair of biasing members 188a, 188b may be formed of any material that may be configured to exhibit a bias towards returning to an original pre-stressed shape, such as, but not limited to, a spring, rubber, silicone, or any other elastic and compressible material or configuration known in the art. Accordingly, each of the pair of biasing members 188a, 188b may operate to simulate a fluid system, such as a hydraulic system, that is based on a speed system. That is, the faster an operator depresses onto the pedal pad 128 of the pedal arm 106, the harder or more difficult the pedal arm 106 is to depress or further pivot, commonly known as a pedal effort force.

In at least one embodiment, the pair of biasing members 188a, 188b may be coaxially aligned such that the biasing member 188b may have a smaller outer diameter than an inner diameter of the biasing member 188a, whereby the biasing member 188b is at least partially nested within the biasing member 188b. As such, the pair of biasing members 188a, 188b may be a redundant biasing system.

It should now be understood that the embodiments of the example pedal assembly described herein utilize an integrated pivot portion extending from a proximate end of a pedal arm while simultaneously sensing the movement of the proximate end of the pedal arm using an inductive sensing techniques and a drive assembly to sense the movement of the proximate end of the pedal arm via Hall Effect sensing techniques. The drive assembly includes a gear with a plurality of teeth that complement gear surface portions of the protrusion of the pedal arm. The drive assembly is configured as a mechanical multiplier that moves a magnet embedded within the gear at a larger angle than the pedal arm such that a Hall Effect sensor assembly may sense a larger change in position of the magnet compared to conventional systems where slight movements may not be sensed by the Hall Effect sensor.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pedal assembly comprising:

a housing;

a pedal arm moveably coupled to the housing, the pedal arm having a pair of protrusions extending therefrom, at least one of the pair of protrusions has a geared surface;

a drive assembly including a gear configured to have a plurality of teeth that complement the geared surface of the one of the pair of protrusions; and a sensing assembly including a first sensor assembly configured to sense movement of the gear and a second sensor assembly configured to sense movement of the at least one of the pair of protrusions, wherein when a force is applied on a pedal pad of the pedal arm, the at least one of the pair of protrusions having the geared surface moves to drive the gear, the first sensor assembly and the second sensor assembly independently sense the movement of the gear and the at least one of the pair of protrusions, respectively.

2. The pedal assembly of claim 1, wherein the drive assembly further comprises a magnet coupled to the gear, the magnet moves when the gear moves to generate a change in a position of the magnet relative to the first sensor assembly.

3. The pedal assembly of claim 2, wherein the first sensor assembly is a Hall Effect sensor configured to sense the change in the position of the magnet.

4. The pedal assembly of claim 3, wherein the drive assembly is configured as a mechanical multiplier that moves the magnet at a larger angle than the pedal arm such that the first sensor assembly senses a larger change in position of the magnet.

5. The pedal assembly of claim 4, further comprising:

a coupler coupled to a terminating surface of the at least one of the pair of protrusions having the geared surface such that the coupler moves with movement of the at least one of the pair of protrusions having the geared surface, wherein the second sensor assembly is configured to sense movement of the coupler.

6. The pedal assembly of claim 5, wherein the second sensor assembly is configured as an inductive sensor to sense the movement of the coupler.

7. The pedal assembly of claim 6, further comprising:

a circuit board positioned adjacent to the coupler and the gear of the drive assembly, the circuit board housing the Hall Effect sensor and the inductive sensor.

8. The pedal assembly of claim 1, further comprising:

an emulator assembly coupled to the pedal arm, the emulator assembly configured to provide a pedal effort force against a depression travel arc of the pedal arm as the force is applied to the pedal pad.

9. A pedal assembly configured for redundant sensing, the pedal assembly comprising:

a housing having a retaining recess;

a first member having a first receiving cavity;

a second member having a second receiving cavity;

a pedal arm moveably coupled to the housing, the pedal arm having a pair of protrusions extending therefrom, at least one of the pair of protrusions has a geared surface, one of the pair of protrusions movably received within the first receiving cavity of the first member and the other one of the pair of protrusions movably received within the second receiving cavity of the second member; and a drive assembly includes a gear configured to have a plurality of teeth that complement the geared surface of the one of the pair of protrusions, wherein when a force is applied onto a pedal pad of the pedal arm, the at least one of the pair of protrusions having the geared surface moves to drive the gear, a first sensor assembly and a second sensor assembly independently sense the movement of the gear and the at least one of the pair of protrusions, respectively.

10. The pedal assembly of claim 9, wherein the drive assembly further comprises a magnet coupled to the gear, the magnet moves when the gear moves to generate a change in a position of the magnet relative to the first sensor assembly.

11. The pedal assembly of claim 10, wherein the first sensor assembly is a Hall Effect sensor configured to sense the change in the position of the magnet.

12. The pedal assembly of claim 11, wherein the drive assembly is configured as a mechanical multiplier that moves the magnet at a larger angle than the pedal arm such that the first sensor assembly senses a larger change in the position of the magnet.

13. The pedal assembly of claim 12, further comprising:
a coupler coupled to a terminating surface of the at least one of the pair of protrusions having the geared surface such that the coupler moves with movement of the at least one of the pair of protrusions having the geared surface,
wherein the second sensor assembly is configured to sense movement of the coupler.

14. The pedal assembly of claim 13, wherein the second sensor assembly is configured as an inductive sensor to sense the movement of the coupler.

15. The pedal assembly of claim 14, further comprising:
a circuit board coupled to the first member to be adjacent to the coupler and the gear of the drive assembly, the circuit board housing the Hall Effect sensor and the inductive sensor.

16. The pedal assembly of claim 9, further comprising:
an emulator assembly coupled to the pedal arm, the emulator assembly configured to provide a pedal effort force against a depression travel arc of the pedal arm as the force is applied to the pedal pad.

17. The pedal assembly of claim 9, wherein the first sensor assembly utilizes a different sensing technology than the second sensor assembly.

18. A pedal assembly comprising:
a housing;
a retaining assembly having a pair of openings, the retaining assembly removably coupled to the housing;
a pedal arm moveably coupled to the retaining assembly, the pedal arm having a pair of protrusions extending therefrom such that each one of the pair of protrusions are received into the respective opening of the retaining assembly, at least one of the pair of protrusions having a geared surface;
a drive assembly including a gear configured to have a plurality of teeth that complement the geared surface of the one of the pair of protrusions; and
a sensing assembly including a first sensor assembly configured to sense movement of the gear and a second sensor assembly configured to sense movement of the at least one of the pair of protrusions,
wherein when a force is applied on a pedal pad of the pedal arm, the at least one of the pair of protrusions having the geared surface moves to drive the gear, the first sensor assembly and the second sensor assembly independently sense the movement of the gear and the at least one of the pair of protrusions, respectively.

19. The pedal assembly of claim 18, wherein the gear of the drive assembly further comprises a magnet coupled to the gear, the magnet moves when the gear moves to generate a change in a position of the magnet relative to the first sensor assembly.

20. The pedal assembly of claim 19, wherein:
the first sensor assembly is a Hall Effect sensor configured to sense the change in the position of the magnet; and
the drive assembly is configured as a mechanical multiplier that moves the magnet at a larger angle than the pedal arm such that the first sensor assembly senses a larger change in the position of the magnet.

* * * * *